United States Patent
Merlin et al.

(10) Patent No.: US 6,686,008 B1
(45) Date of Patent: *Feb. 3, 2004

(54) SILICONE/MULTIFUNCTIONAL ACRYLATE BARRIER COATINGS

(75) Inventors: Patrick J. Merlin, Neufvilles (BE); Daniel Futter, Brussels (BE); John E. Wyman, Sanibel, FL (US); Imtiaz Rangwalla, Andover, MA (US); Gary Power, Melbourne (AU); Karen Branch, London (GB)

(73) Assignees: EG Technology Partners, L.P., Wilmington, MA (US); Dow Corning Corporation, Midland, MI (US); UBC Films PLC, Star House, Watford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,253
(22) PCT Filed: Jan. 16, 1998
(86) PCT No.: PCT/BE98/00006
§ 371 (c)(1), (2), (4) Date: Dec. 17, 1999
(87) PCT Pub. No.: WO98/31720
PCT Pub. Date: Jul. 23, 1998

(30) Foreign Application Priority Data

Jan. 17, 1997 (GB) ............................................. 9700910
Jan. 17, 1997 (GB) ............................................. 9700964

(51) Int. Cl.[7] ............................ B32B 27/08; C09J 4/00; C08F 230/08
(52) U.S. Cl. ...................... 428/35.7; 428/36.91; 522/46; 522/106; 524/81; 524/220; 524/221; 524/591; 525/420; 525/423; 525/424; 525/425; 525/426; 525/427; 525/431; 528/271; 528/310; 528/320; 528/322; 528/422
(58) Field of Search ................................. 528/310, 320, 528/322, 271, 422; 522/46, 106; 524/81, 220, 221, 591; 525/420, 423, 424, 425, 426, 427, 431; 428/35.7, 36.91

(56) References Cited

U.S. PATENT DOCUMENTS

| | | | |
|---|---|---|---|
| 2,146,210 A | 2/1939 | Graves | 260/23 |
| 2,721,873 A | 10/1955 | Mackenzie et al. | 260/448.2 |
| 3,225,013 A | 12/1965 | Fram | 260/78 |
| 3,655,633 A | 4/1972 | Saam | 260/79 |
| 3,728,215 A | 4/1973 | Espy | 162/167 |
| 4,032,487 A | 6/1977 | Columbus | 260/17 |
| 4,483,891 A | 11/1984 | Cerny | 428/35 |
| 4,569,879 A | 2/1986 | Groves | 428/198 |
| 5,215,822 A | 6/1993 | Wyman et al. | 428/447 |
| 5,260,350 A | 11/1993 | Wright | 522/42 |
| 5,368,941 A | 11/1994 | Blizzard et al. | 428/412 |
| 5,374,483 A | 12/1994 | Wright | 428/412 |
| 5,434,007 A | 7/1995 | Yeh | 428/446 |
| 5,449,552 A | 9/1995 | Bochow et al. | 428/323 |
| 6,514,584 B1 * | 2/2003 | Merlin et al. | 428/36.7 |

FOREIGN PATENT DOCUMENTS

| | | | |
|---|---|---|---|
| EP | 0 408 047 | 1/1991 | ........... C08G/77/38 |
| EP | 0424007 A2 * | 4/1991 | |
| EP | 0 666 290 | 8/1995 | ............ C09D/4/00 |
| JP | 7-18221 | 7/1993 | |

OTHER PUBLICATIONS

Grant (ed.), Hack's Chemical Dictionary, 4th edition, pp. 249 and 364 (1969).*

* cited by examiner

Primary Examiner—Sandra M. Nolan
(74) Attorney, Agent, or Firm—Alan Zombeck

(57) ABSTRACT

The invention is a composition made by mixing a multifunctional acrylate with an aminofunctional silane and an ethylenically unsaturated acid to form a reaction product, optionally dissolved in a solvent, characterized in that the multifunctional acrylate has a molecular weight of from about 100 to about 3000. The composition can be coated on a substrate, then optionally exposed to moisture and treated to initiate a free radical reaction. The invention can be applied to a variety of substrates used in packaging applications. The reaction mixture can further be cured by heating in the presence of moisture. The free radical reaction can be initiated by electron beam irradiation, ultraviolet radiation, gamma radiation, and/or heat and chemical free radical initiators.

29 Claims, No Drawings

SILICONE/MULTIFUNCTIONAL ACRYLATE BARRIER COATINGS

FIELD OF THE INVENTION

The invention relates to silicone containing compositions and coatings formed therewith having barrier properties which are useful in packaging applications. In another aspects, the invention relates to a method for the manufacture of a coated substrate having barrier properties and to a packaging container.

BACKGROUND OF THE INVENTION

It is well known that coatings containing silane compounds and itaconic acid improve the gas, oil, and flavor barrier performance of organic polymer film substrates. Moreover, the adhesion of the coating to the film surface, as well as the improved barrier characteristics provided by the silane coating, are greatly enhanced by exposing the coated film to electron beam radiation. As particularly useful barrier composition is described in U.S. Pat. No. 5,215,822, which teaches a methanol solution of a vinyl benzyl amine silane (Dow Corning Corp. Z-6032), itaconic acid, and water, coating this solution on a corona treated low density polyethylene film, drying, and then subjecting the coated film to electron beam radiation to graft the coating to the film surface and further improve the barrier properties of the silane coating. However, while this coating gives excellent gas barrier properties at low to moderate relative humidity values, the gas permeability increases drastically at very high relative humidity values.

The present inventors have surprisingly discovered that the combination of an aminofunctional silane, a multifunctional acrylate and an ethylenically unsaturated acid gives excellent gas barrier properties at low to moderate relative humidity values, as well as excellent gas barrier properties at very high relative humidity values.

While other patents teach the combination of a mono or multifunctional acrylate with an aminofunctional silane, none teaches the addition of the ethylenically unsaturated acid with an acrylate. For example, U.S. Pat. No. 5,368,941 teaches a deformable, abrasion-resistant coating formulated from at least one multi-functional acrylate monomer, at least one aminofunctional silane, colloidal silica and at least one acrylate-terminated polyalkylene oxide. The acrylate-terminated polyalkylene oxide helps prevent gelling of the coating composition during stripping and also imparts the composition with deformability, without sacrificing abrasion resistance.

Also, U.S. Pat. No. 5,434,007 teaches a silane resin coated on a plastic film, where the silica resin is composed of a monofunctional acrylate and an aminofunctional silane. The composition does not utilize a free radical cure, nor does it incorporate the ethylenically unsaturated acid.

U.S. Pat. Nos. 5,260,350 and 5,374,483 and EP-A-666,290 relate to a silicone coating composition which, when cured on a solid substrate either by ultraviolet or electron beam radiation, provides a transparent abrasion resistant coating firmly adhered thereon. The silicone coating is prepared by reacting at least one multifunctional acrylate monomer with an amino-organofunctional silane, mixing the modified silane with at least one acrylic monomer and thereafter adding colloidal silica. Again however, neither of these compositions teach the addition of an ethylenically unsaturated acid to achieve barrier properties. JP (Kokai) publication 7-18221 published on Jan. 20, 1995 teaches a surface treatment composition for gas barrier comprising an aminosilane and a compound having an aromatic ring or hydrogenated ring. The present invention is distinguishable, however, because it does not require the addition of cyclic compounds having an aromatic ring.

The present invention is distinguishable over each of the above cited prior art because none teach the combination of an aminosilane, multifunctional acrylate and ethylenically unsaturated acid to achieve gas barrier properties.

SUMMARY OF THE INVENTION

The invention is a composition made by mixing in any order a multifunctional acrylate with an amino functional silane and an ethylenically unsaturated acid to form a reaction product, optionally dissolved in a solvent, where the multifunctional acrylate has a molecular weight of from about 100 to about 3000, and the aminofunctional silane has at least one molecule of the formula

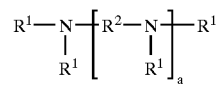

wherein $0 \leq a \leq 4$ $R^1$ is independently hydrogen, alkyl, substituted alkyl, aryl, substituted aryl, arylalkyl, acryl, methacryl, alkylaryl, $R^2$—$SiR_m(OR)_{3-m}$, or an alkylene linking group having 2 to 12 carbon atoms connected to one or two nitrogen atoms, with the proviso that at least one $R^1$ is a hydrogen atom and at least one $R^1$ is an $R^2$—$SiR_m(OR)_{3-m}$ group, when m is 0, 1 or 2, and R is independently a hydrogen or an alkyl group having from 1 to 6 carbon atoms;

$R^2$ is independently selected from the group consisting of:
linear or branched alkylene groups having from 1 to 12 carbon atoms;
arylene groups having from 6 to 12 carbon atoms; and
linear or branched hydrocarbon groups having from 1 to 16 carbon atoms and at least one alcohol, alcohol ether, ester, amide, urea, thiourea or polyether group.

In the scope of the present description, molecular weight means number average molecule weight in the case of polymers and exact weight in the case of small molecules or of oligomers. The composition can be coated on a substrate, then optionally exposed to moisture and treated to initiate a free radical reaction. The composition can be applied to a variety of substrates used in packaging applications. The composition can be cured by further heating in the presence of moisture. The free radical reaction can be initiated not only by heating but by electron beam irradiation, ultraviolet radiation, gamma radiation, and/or heat and chemical free radical initiators.

A composition according to the present invention may be employed to provide a barrier layer which improves resistance of the material to transmission of gases and aromas therethrough. For example, a 30 micron uncoated biaxially oriented, corona treated polypropylene film is generally found to have a permeability to oxygen of 1500 cc/m²/day as measured at ASTM D3985-81 measured at 80% relative humidity. With the present coatings, the oxygen transmission rate of the same film can be reduced to less than 250 cc/m²/day as measured at 80% relative humidity. As used herein, the terminology "improved barrier" refers to a coating which can reduce oxygen transmission rate of the aforementioned uncoated polypropylene film from 1500 cc/m²/day to 250 cc/m²/day as measured at ASTM D3985-81 measured at 80% relative humidity.

DESCRIPTION OF THE PREFERRED EMBODIMENTS

While the invention is susceptible of embodiment in many different forms there is described herein in detail preferred and alternate embodiments of the invention. It should be understood, however, that the present disclosure is to be considered an exemplification of the principles of the invention and is not intended to limit the spirit and scope of the invention and/or claims of the embodiments illustrated.

Aminofunctional Silanes

The aminofunctional silanes are described generally by the formula:

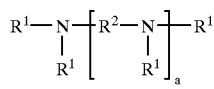

wherein
$0 \leq a \leq 4$ $R^1$ is independently hydrogen, alkyl, substituted alkyl, aryl, substituted aryl, arylalkyl, acryl, methacryl, alkylaryl, $R^2$—$SiR_m(OR)_{3-m}$, or an alkylene linking group having 2 to 12 carbon atoms connected to one or two nitrogen atoms, with the proviso that at least one $R^1$ is a hydrogen atom and at least one $R^1$ is an $R^2$—$SiR_m(OR)_{3-m}$ group, where m is 0, 1 or 2, and R is independently a hydrogen or an alkyl group having from 1 to 6 carbon atoms;

$R^2$ is independently selected from the group consisting of:
linear or branched alkylene groups having from 1 to 12 carbon atoms;
arylene groups having from 6 to 12 carbon atoms; and
linear or branched hydrocarbon groups having from 1 to 16 carbon atoms and at least one alcohol, alcohol ether, ester, amide, urea, thiourea or polyether group.

The most preferred aminofunctional silanes used for the present invention are N-(2-aminoethyl)-3-aminopropyltrimethyoxy silane, and aminopropyltriethoxysilane, and blends thereof.

For the purposes of the present invention, the above mentioned amine functional silane group has the general formula

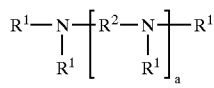

In the above formula, $R^1$ is a monovalent radical independently selected from the group consisting of hydrogen; acryl, methacryl, alkyl groups having 1 to 15 carbon atoms, such as methyl, ethyl, propyl, isobutyl, hexyl, octyl, decyl, dodecyl and octadecyl; substituted alkyl having 1 to 18 carbon atoms, such as 3-chloropropyl and 3,3,3-trifluoropropyl; aryl having 6 to 16 carbon atoms, such as phenyl and naphthyl; substituted aryl having 6 to 30 carbon atoms, such as chlorophenyl, chlorotolyl and dichloroxylyl; arylalkyl having 7 to 9 carbon atoms, such as benzyl, phenethyl and 3-phenylpropyl; and alkylaryl having 7 to 16 carbon atoms, such as tolyl, xylyl, ethylphenyl and propyltolyl. According to the invention, at least one $R^1$ group is hydrogen. Further, at least one $R^1$ is an $R^2$—$SiR_m(OR)_{3-m}$ group, where R is an alkyl group having from 1 to 6 carbon atoms, m is 0, 1, or 2 and $R^2$ is defined below. The remaining $R^1$ groups on the aminosilane are preferably hydrogen or methyl.

$R^1$ can also be an alkylene linking group which links two different nitrogen atoms on the same molecule together, thus forming a cyclic aminosilane. The alkylene linking group can also be an arylene group which is connected to two different bonding sites on the same nitrogen atom. The alkylene linking group will have at least 2 carbon atoms and as many as 12 carbon atoms.

$R^2$ is an organic connecting group which provides a separation of at least one carbon atom between the nitrogen atoms or the nitrogen and silicon atoms. Thus, $R^2$ can be an alkylene group having at least 1 carbon atom or an arylene group having at least 6 carbon atoms. Preferably, $R^2$ is selected from the group consisting of ethylene, propylene, butylene, isobutylene, trimethylene, tetramethylene, and hexamethylene.

In addition, $R^2$ can contain polar groups such as, linear or branched hydrocarbon groups having from 1 to 16 carbon atoms and at least one alcohol, alcohol ether, ester, amide, urea, thiourea or polyether group. Specific examples of such groups include, those having the general formula —$CH_2CH(OH)(CH_2)_x$—, —$CH_2CH(OH)(CH_2)_x$—$O$—$(CH_2)_y$—, —$CH_2CH(CH_3)C$;=$O$)—$O$—$(CH_2)_y$—, —$CH_2CH_2C(=O)$—$O$—$(CH_2)_y$—, —$CH_2CH_2C(=O)$—$N(R)$—$(CH_2)_y$—, —$C(=O)$—$N(R)$—$CH_2)_y$—, —$C(=S)$—$N(R)$—$(CH_2)_y$—, or where x and y are each integers from 1 to 12. The hydroxyl and ester groups are highly polar, and it is believed the polar nature of the groups improve barrier properties.

Examples of specific amino-containing groups include such structures as —$CH_2CH_2CH_2NH_2$, —$CH_2CH_2CH_2N(H)CH_2CH_2NH_2$, —$CH_2CH_2CH_2N(H)CH_2CH_2N(H)CH_2CH_2NH_2$, —$CH_2CH_2CH_2CH_2NH_2$, —$CH_2CH_2CH_2CH_2CH_2NH_2$, —$CH_2CH_2CH_2N(H)Me$, —$CH_2CH_2CH_2N(H)CH_2CH_2NMe_2$, —$CH_2CH_2CH_2N(H)Et$, —$CH_2CH_2CH_2N(Et)H$, —$CH_2CH(CH_3)CH_2N(H)CH_2CH_2NH_2$ and —$CH_2CH(CH_3)CH_2NH_2$, inter alia, wherein Me and Et denote methyl and ethyl, respectively. A specific example of an amine containing cyclic group is piperazine.

As used herein the term "aminofunctional silane" can mean a single species of the formula described above, such as N-(2-aminoethyl)-3-aminopropyltrimethoxy silane, or it can mean mixtures or one or more species of aminofunctional silanes, such as N-(2-aminoethyl)-3-aminopropyltrimethoxy silane and aminopropyltriethoxysilane.

The above described aminofunctional silanes can be prepared by methods known to those skilled in the art, and which are amply described in the chemical literature.

Multifunctional Acrylates

The multifunctional acrylates of the present invention are defined as acrylates having, on average, greater than two functional acrylate groups per molecule and a molecular weight of from about 100 to about 3000. Multifunctional acrylates are preferred over monofunctional acrylates because monofunctional acrylates do not form flexible, crack free coatings as do the multifunctional acrylates. The majority of multifunctionl acrylates commercially available can be used, but it is the smaller, more compact, i.e., proportionally more reactive acrylates that give the best results. The multifunctional acrylates are preferably selected from the group consisting of acrylated polyols with molecular weights of from 150 to about 600; polyester urethane acrylates with molecular weights of from about 1000 to about 2000; polyether acrylates with molecular weights from 200 to 1500; polyurethane acrylates with molecular weights of from about 400 to about 2000; polyurea acrylates with molecular weights of from about 400 to about 2000; epoxy acrylates with molecular weights of from about 300 to about 1000; and mixtures of multifunctional acrylates thereof.

Most preferred acrylates are pentaerythritol tetraacrylate; an acid functional acrylate; polyester tetra acrylate; polyether tetra acrylate; an aliphatic urethane acrylate, Ebecryl 1290; ditrimethylolpropane tetra acrylate; an ethoxylated trimethylol propane triacrylate, Ebecryl 160.

Other preferred acrylate include glycerol triacrylate, triacrylate ester of tris-[z-hydroxy-ethyl]isocyanurate, hexane dioldiacrylate, and dipentaerythritol hexacrylate. Ethoxylated and propoxylated versions of these acrylates may be used in this invention. These acrylates and methods of their production are well known in the art, and available commercially from such companies as UCB Radcure, (Brussels, Belgium) and Sartomer Corp. (Philadelphia, Pa.) As used herein, the term "mixtures of multifunctional acrylates" means mixtures of different acrylates of the same species, such as two different epoxy acrylates, or mixtures of different species of acrylates, such as epoxy acrylates and urethane acrylates.

Ethylenically Unsaturated Acid

In addition to the aminosilane and the multifunctional acrylate, a quantity of an ethylenically unsaturated acid is added to the composition. By "ethylenically unsaturated acid" it is meant any acid which has vinyl unsaturation. It is believed that the ethylenically unsaturated acid substantially improves the oxygen barrier performance of the composition because the carboxylic group forms an amine salt with amino groups of the aminosilane, which contributes significantly to the coating's barrier properties. The ethylenically unsaturated acid is likely to be added in the amount of at least 5 to about 60 parts by weight of the composition, with about 30 to about 50 parts by weight being most preferred. The most preferred ethylenically unsaturated acids used in the present invention are dicarboxylic (i.e. have two carboxylic acid groups) or monoalkylester thereof and the most preferred is itaconic acid; however, other acids such as fumaric, maleic, citraconic, methacrylic, acrylic, sorbic, cinnamic, vinyl sulfonic acid, mesaconic acid, and itaconic acid monomethylester may also be used. The term "ethylenically unsaturated acid" as used herein includes mixtures of one or more of the aforementioned acids.

Solvents

The components of the present invention can optionally be reacted together in a solvent. In general, water, alcohols and blends thereof will serve as suitable solvents because the multifunctional acrylate and the ethylenically unsaturated acid are soluble therein. Typically, the solvent is a water/alcohol mixture where the alcohol is present in an amount of about 1–99%. In addition, the selected solvent must wet the substrate. Preferably, the solvent will be nontoxic, and will not extend the drying time of the coating beyond what is commercially acceptable. The amount of solvent can range from about 20 to about 99 parts by weight and is preferably from about 60 to about 95 parts by weight of the total composition. Preferred solvents are methanol, ethanol, n-propanol, isopropanol, butanol, and 1-methoxy-2-propanol (available as "Dowanol PM" from the Dow Chemical Co., Midland, Mich.).

Critical Ratios

During the reaction of aminosilanes with multifunctional acrylates, it is possible to utilize an excess of multifunctional acrylate over and above that required to react with the amino nitrogen atoms. In multifunctional acrylates, such as pentaerythritol tetraacrylate, the amine chains attached to the trimethoxysilyl groups may also have pendent acrylate groups which will undergo further polymerization under the influence of ionizing radiation. It is believed that the acrylate groups of the multifunctional acrylate and the amino groups of the aminofunctional silane undergo an additional reaction (Michael Addition) readily upon mixing of these two components. In addition, hydroxyl groups and solvents present may interact with alkoxy groups attached to the silicone atoms of the aminofunctional silane and cause a thickening of the composition at certain concentrations of the components in the solvent.

For example, one may employ an "amine rich" system, in which the total number of amine functional sites in the composition due to the aminofunctional silane can be up to about six (6) times greater than the total number of acrylate sites in the composition due to the multifunctional acrylate, i.e, the ratio of amine functionality to the acrylate functionality can be from about 6:1 to about 1:1, with a ratio of about 4:1 to about 1:1 being preferred, and with a ratio of 2:1 being most preferred. In the case where the aminofunctional silane is N-(2-aminoethyl)-3-aminopropyltrimethoxy silane or aminopropyltriethoxysilane, and the multifunctional acrylate is pentaerythritol tetraacrylate, the ratios in the amine rich system can be expressed in terms of molar ratios, with the preferred molar ratio of aminosilane to multifunctional acrylate being from about 6:1 to about 1:1, with a molar ratio of about 4:1 being most preferred.

Excellent results can also be achieved using an "acrylate rich" system, where the total number of reactive nitrogen sites in the composition from the aminofunctional silane is up to about six (6) times less than the total number of reactive acrylate sites in the composition due to the multifunctional acrylate, i.e., the ratio of amine functionality to acrylate functionality can be from about 1:1 to about 1:6, with a range of about 1:3 being preferred. In the case where the aminofunctional silane is N-(2-aminoethyl)-3-aminopropyltrimethoxy silane or aminopropyl-triethoxysilane, and multifunctional acrylate is pentaerythritol tetraacrylate, the ratios of the acrylate rich system can be expressed in terms of molar ratios, with the preferred molar ratio of aminosilane to multifunctional acrylate being from about 1:1 to about 1:3, with a molar ratio of about 1:1.5 being most preferred.

The molar ratio of the ethylenically unsaturated acid to the aminofunctional silane is about 1:1 or greater.

Although the order of addition of the components to provide a composition according to the present invention is not critical, certain methods are preferable. For example, the aminofunctional silane and the acrylate component can be added together to form a Michael Adduct, before the addition of ethylenically unsaturated acid. Also, the ethylenically unsaturated acid may be added at some point after the Michael Addition reaction begins, but before the aminosilane and/or the acrylate are completely consumed. "Quenching" the reaction by adding the ethylenically unsaturated acid can occur at any point in the reaction process, i.e., the acid may be added to the aminosilane before any acrylate is added, or after most of the acrylate is added. Practically, the reaction may be quenched at a predetermined point by simply adding part of the acrylate to the aminosilane, then adding the rest of the acrylate and the acid to this mixture. It is preferred that the quenching technique be used with the amine rich formulations of the invention.

Coat Weight

The coating can be applied in any desired amount, however, it is preferred that the coating be applied in an amount of from about 0.05 to about 20 gms/m$^2$, the preferred coating weight being from about 0.5 to about 10 gms/m$^2$. Coating weight can be determined by gravimetric comparison. The coating can be applied to the substrate by any conventional method, such as spray coating, roll coating, slot coating, meniscus coating, immersion coating, and direct, offset, and reverse gravure coating.

Substrates

The coating can be disposed on a wide variety of substrates, including, but not limited to polyolefins, such as oriented polypropylene (OPP), cast polypropylene, polyethylene and polyethylene copolymers, polystyrene, polyesters, such as polyethylene terephthalate (PET), or polyethylene naphthalate (PEN), polyolefin copolymers, such as ethylene vinyl acetate, ethylene acrylic acid and ethylene vinyl alcohol (EVOH), polyvinylalcohol and copolymers thereof, polyamides, such as nylon, and MXD6, polyimides, polyacrylonitrile, polyvinylchloride, polyvinyl dichloride, polyvinylidene chloride, and polyacrylates, ionomers, polysaccharides, such as regenerated cellulose, and silicone, such as rubbers or sealants, other natural or synthetic rubbers, glassine or clay coated paper, paper board or craft paper, and metallized polymer films and vapor deposited metal oxide coated polymer films, such as AlO$_x$, SiO$_x$, or TiO$_x$.

The aforesaid substrates are likely to be in the form of a film or sheet, though this is not obligatory. The substrate may be a copolymer, a laminate, a coextruded, a blend, a coating or a combination of any of the substrates listed above according to the compatibility of the materials with each other. In addition, the substrate may be in the form of a rigid container made from materials such as polyethylene, polypropylene, polystyrene, polyamides, PET, EVOH, or laminates containing such materials.

The aforesaid substrates may also be pretreated prior to coating by corona treatment, plasma treatment, acid treatments and flame treatments, all of which are known in the art.

In addition, the compositions of the present invention can be used for a wide variety of packaging containers, such as pouches, tubes, bottles, vials, bag-in-boxes, stand-up pouches, gable top cartons, thermo-formed trays, brick-packs, boxes, cigarette packs and the like. In addition, the compositions of the present invention may be used as a laminating adhesive.

Of course, the present invention is not limited to just packaging applications, and may be used in any application wherein gas, or aroma barrier properties are desired, such as tires, buoyancy aides, inflatable devices generally, etc.

Any of the foregoing substrates may have a primer or primers applied thereon. The primers are applied to the substrates by methods known in the art such as spray coating, roll coating, slot coating, meniscus coating, immersion coating, and indirect, offset, and reverse gravure coating. Suitable primers include, but are not limited to carbodiimide, polyethylenimine, and silanes, such as N-(2-aminoethyl)-3-aminopropyltrimethoxy silane and aminopropyltriethoxysilane.

Curing

While the compositions of the present invention will form films at ambient conditions, optimum results are achieved by heating and/or free radical cures. Generally, the higher the temperature, the faster the coating will solidify. The upper limit to the heating is the temperature at which the substrate will undergo unacceptable distortion. Also, heating will accelerate the rate of hydrolysis of silicon/alkoxy groups and also the rate of condensation of the silicon bonded alkoxy groups with silicon bonded hydroxy groups to form silicon-oxygen-silicon groups. The composition may be dried at room temperature or in an oven at temperatures up to about 140° C., with temperatures of from about 60° C. to about 120° C. being preferred and temperatures of about 90° C. to about 110° C. being most preferred. Heating time is temperature dependent and the coating will reach tack free time in one to 10 seconds. The heating step serves to evaporate the solvent when used and accelerate the condensation reaction between Si—OH groups and SiOH/SiOH groups.

The compositions may be further cured by initiating a free radical reaction. The most preferred method of initiating the free radical reaction is through the use of electron beam radiation, although ultraviolet or free radical generators such as azo compounds and peroxides may also be used.

The compositions are preferably cured by a free radical generator, such as ultraviolet, electron beam, or gamma radiation or chemical free radical generators such as azo compounds and peroxides. Low energy electron beam irradiation is the preferred method of curing because it is cheaper than gamma sources like Cobalt M-60. Its advantage over ultraviolet radiation as a cure system lies in its ability to generate free radicals without photoinitiators. It also imparts higher yields of crosslink density and chemical grafting of the coating to the substrate. Electron beam accelerators of various types such as van de Graaf-type, resonance transformer-type, linear-type, dynamatron-type and high frequency-type can be used as a source of electron beam. Electron beam having energy of from about 5 to about 2000 KeV, preferably from about 50 to about 300 KeV discharged therefrom may be irradiated in a dose of from about 0.1 to about 10 Mrads (MR). Low electron beam voltages (less than 20 KeV) may be used if the substrate is treated in a vacuum. Commercially available sources of electron beam are Electro Curtain CB-150 available from Energy Sciences, Inc. (Wilmington, Mass.).

The compositions may also be ultraviolet light cured if one or more photoinitiators is added prior to curing. There are no special restrictions on the photoinitiators as long as they can generate radicals by the absorption of optical energy. Ultraviolet light sensitive photoinitiators or blends of initiators used in the UV cure of the present composition include 2-hydroxy-2-methyl-1-phenyl-propan-1-one (Darocure 1173), sold by EM Chemicals, and 2,2 Dimethoxy-2-phenylacetol-phenone (Irgacure 651), sold by Ciba-Geigy Corporation, Hawthorne, N.Y. For purposes of this invention, it has been found that from about 0.05 to about 5 weight percent based on the total solids in the composition, of the photoinitiators described herein will cause the composition to cure.

In addition to radical polymerization and grafting to crosslink the coating after it has been applied to the substrate, it is possible to further crosslink the composition utilizing acid catalyzed condensation reactions. In this reaction, a methoxylated active hydrogen compound, such as trimethylol phenol, or a mixture of formaldehyde with aldehydes, ketones, and other active hydrogen compounds react with amine salts, such as the itaconate salts of the amine silanes or derivatives to form alkylated amines.

Preferred Embodiments

To prepare the preferred embodiment of the invention, the acrylate component, preferably pentaerythritol tetraacrylate (PETA), is dissolved in a solvent such as Dowanol PM. The silane, preferably N-(2-amino ethyl) gamma aminopropyl trimethoxysilane is added to the acrylate solution so that the molar ratio of aminosilane to acrylate is about 4:1. This mixture is allowed to equilibrate for one hour at ambient conditions. Itaconic acid, in an amount of about 1.3 moles per gram atom of nitrogen is then added to the equilibrated solution. The coating solution is applied to corona treated 30 micron thick "RAYOPP" oriented polypropylene film from UCB Films. The coated film is placed immediately in an oven maintained at about 80–100° C. and held there for about 10 minutes. The oven is maintained at a relative humidity of about 50%. The dried coated film is then "cured" by an electron beam dose of 10 Mrads at 170 kV.

Optional Additives

Various optional additives can be added to the composition to improve various properties. These additives may be added as desired and in any amount as long as they do not reduce the performance of the barrier coatings as illustrated herein. Examples of additives include additional additives as earlier described, antiblock and slip aides such as stearamide, oleamide or polar additives, such as epoxides, polyols, glycidols or polyamines, such as polyethylenimine, and other silanes may be added. Specifically, excluded from the scope of the present invention are colloidal silicas and silanes or other molecules having four alkoxy or other hydrolyzable groups disposed on a single silicone or other organometallic atom, such as tetra ethoxy silane, and the like. Wetting agents, such as a polyethoxylated alkyl phenol may also be added.

EXAMPLES

Experiments 1–10 illustrate the utility of a mixture of itaconic acid with the Michael addition product of various acrylate esters with N-(2-amino ethyl)gamma aminopropyl trimethoxysilane, hereinafter referred to as Z-6020, as a gas barrier coating on polypropylene film. In experiments 1–12 the Z-6020, acrylate ester, and itaconic acid were utilized in a molar ratio of 4:1:10.4 with a total solids content of 34 grams/104 grams of solution. The solvent employed in all the experiments described below was 1-methoxy-2-propanol, available commercially from Dow Chemical Company (Midland, Mich.) as "Dowanol PM". The Z-6020 was obtained from Dow Corning Corporation (Midland, Mich.) and the itaconic acid from Aldrich Chemical Company (Milwaukee, Wis.). The coating solutions were all applied to corona treated 30 micron thick "RAYOPP" oriented polypropylene film from UCB Films utilizing a #12 Myers rod. The coated film was placed immediately in a laboratory oven maintained at 80–100° C. and held there for 10 minutes. Two open pans of water placed on the bottom shelf of the oven maintained a relative humidity of about 50%.

The heated coated film was then "cured" by an electron beam dose of 10 Mrads at 170 KeV. The oxygen permeability values for each film were measured and recorded in units of cc/square meter per 24 hours, "dry" values being measured at 0% relative humidity using a MOCON Oxtran Model 100 and "wet" values at 80–82% relative humidity utilizing a MOCON Model 2/20 MH. The MOCON instruments were obtained from Modern Controls Corporation. For comparison, the polypropylene base film had a permeability of about 1500 cc/square/meter 24 hours.

Experiment 1

A solution of 3.777 g. of "Ebecryl 770", a monofunctional polyester acrylate with a reported molecular weight of 280, obtained from UCB Radcure, in 70 g. of Dowanol PM was prepared and 11.982 g. of Z-6020 was added with stirring. After one hour at ambient temperature, 18.241 g. of itaconic acid was added and stirred to dissolve. While measuring the dry permeability, the sample developed numerous cracks, which made the coating unsuitable for use as a barrier film.

Experiment 2

A solution of 9.744 g. of "Ebecryl 810", polyester tetra acrylate with a reported molecular weight of 900 obtained from UCB Radcure, was prepared in 70 g. of Dowanol PM, and 9.615 g. of Z-6020 was added. After standing at ambient temperature for one hour, 14.641 g. of itaconic acid was added and stirred to dissolve. After coating, drying and curing the dry permeability was 12.55 cc and the wet permeability was 259 cc.

Experiment 3

A solution of 8.782 g. of "Ebecryl 1290", an aliphatic urethane acrylate having six acrylate groups per molecule with a reported molecular weight of 780, obtained from UCB Radcure, was prepared in 70 g. of Dowanol PM, and 9.996 g. of Z-6020 was added with stirring. After standing at ambient temperature for one hour, 15.222 g. of itaconic acid was added and stirred to dissolve. After coating, drying and curing, the permeability was 5.23 cc dry and 38 cc wet.

Experiment 4

A solution of 5.885 g. of "Ebecryl 140", ditrimethylolpropane tetra acrylate, reported molecular weight 466, obtained from UCB Radcure, was prepared in 70 g. of Dowanol PM. To this solution was added 11.159 g. of Z-6020 and after standing one hour at ambient temperature, 18.285 g. of itaconic acid was added and stirred to dissolve. In this experiment, 11.2 mmoles of itaconic acid was employed and the solids were 35.299 g. in 105.299 g. of solution. After coating, drying and curing, the permeability was 1.1 cc dry and 151 cc wet.

Experiment 5

A solution of 5.454 g. of "Ebecryl 160", an ethoxylated trimethylol porpane triacrylate with a reported molecular weight of 428 obtained from UCB Radcure, in 70 g. of Dowanol PM was prepared and 11.315 g. of Z-6020 was added. After standing one hour at ambient temperature, 17.231 g. of itaconic acid was added and stirred to dissolve. After coating, drying and curing the permeability was 0.1 dry and 154 wet.

Experiment 6

A solution of 5.454 g. of "SR 9020", a propoxylated glyceryl triacrylate with a reported molecular weight of 428, obtained from Sartomer Corporation, was prepared in 70 g. Dowanol PM, and 11.315 g. of Z-6020 was added. After standing one hour at ambient temperature, 17.231 g. of itaconic acid was added and stirred to dissolve. After coating, drying and curing the dry permeability was 0.5 cc and the wet permeability was 102 cc.

Experiment 7

A solution of 10.492 g. of "Ebecryl 80", a polyether tetra acrylate with a reported molecular weight of 1000, obtained from UCB Radcure, was prepared in 70 g. of "Dowanol PM" and 10.492 g. of Z6020 was added. After standing one hour at ambient temperature, 14.188 g. of itaconic acid was added and stirred to dissolve. After coating, drying, and curing the dry permeability was 6.3 cc and the wet permeability was 224 cc.

Experiment 8

A solution of 6.457 g. of "Ebecryl 3720", an epoxy diacrylate with a molecular weight of 525, supplied by UCB Radcure, was prepared in 70 g of "Dowanol PM". To this solution was added 10.921 g. of Z-6020, and after standing at ambient temperature for one hour, 16.622 g. of itaconic acid was added. After coating, drying, and curing the dry permeability was 0.2 cc and the wet permeability was 62 cc.

Experiment 9

A solution of 5.399 g. "SR 360", the triacrylate ester of tris (2-hydroxy ethyl) isocyanurate, molecular weight 423 ,supplied by Sartomer Company, was prepared in 70 g. of Dowanol PM. To this solution was added 11.339 g. of Z-6020, and after standing one hour at ambient temperature, 17.262 g. of itaconic acid was added and stirred to dissolve. After coating, drying, and curing the dry permeability was 0.3 cc and the wet permeability was 55 cc.

Experiment 10

A solution of 10.492 g. of "Ebecryl 220", an aromatic urethane hexaacrylate ester with a reported molecular weight of 1000, supplied by UCB Radcure, was prepared in 70 g. of Dowanol PM and 9.139 g. of Z-6020 was added. After standing at ambient temperature for one hour, 14.188 g. of itaconic acid was added and stirred to dissolve. After coating, drying and curing the dry permeability was 3.6 cc and the wet permeability was 144 cc.

Experiments 11–13 illustrate the effectiveness of the mixture of itaconic acid with Michael addition product of gamma aminopropyl triethoxysilane with various acrylate esters in providing barrier coatings on polypropylene film. The molar ratio of silane:acrylate ester:itaconic acid in these experiments was 4:1:8. The substrate as well as the coating, drying and curing conditions were the same as those used in Experiments 1–12 and which are described above.

Experiment 11

A solution of 5.260 g. of "SR 295", pentaerythritol tetraacrylate, calculated molecular weight of 352, supplied by Sartomer Company, was prepared in 70 g. of Dowanol PM and 13.206 g. of gamma aminopropyl triethoxysilane, supplied by Union Carbide Corporation (Danbury, Conn.) as "A-1100", was added. After standing at ambient temperature for one hour, 15.534 g. of itaconic acid (obtained from Aldrich Chemical Corp.) was added and stirred to dissolve. After coating, drying and curing the dry permeability was 2.9 cc and the wet permeability was 235 cc.

In a 250 ml beaker was prepared a solution of 4.863 g. of pentaerythritol tetraacrylate in 70 g. of dry isopropanol and 12.21 g. of gamma-aminopropyl triethoxysilane, (A-1100, obtained from Union Carbide Corporation) was added and the solution was allowed to stand overnight at ambient temperature. A quantity of 12.927 g. of itaconic acid was added and the mixture was stirred to obtain a clear solution. A 25 weight percent solids solution was prepared by adding 10 g. of isopropanol to 50 g. of the above solution. After coating, drying and curing, the dry permeability was 0.2 cc and the wet permeability was 88 cc. The dry coat weight was 2.9 g./square meter.

In a 250 ml beaker, a solution of 3.822 g. of pentaerythritol tetraacrylate in 70 g. of isopropanol was prepared, and 11.505 g. of N-(gamma trimethoxysilylpropyl), diethylenetriamine supplied by OSI as A-1130 was added with stirring. The solution was maintained at ambient temperature overnight, and 14.673 g. of itaconic acid was added. The grey precipitate was stirred until a clear solution was obtained. The solution was diluted to 25 weight percent solids using dry isopropanol, coated and cured as described. The dry coat weight was 3.15 g./square meters, the dry permeability was 0.1 cc and the wet permeability was 44 cc.

In a 250 ml beaker a solution of 3.381 g. of pentaerythritol tetraacrylate in 70 g. of isopropanol was prepared, and 14.847 g. of bis-(gamma trimethoxysilylpropyl) amine (A-1170, supplied by Osi) was added with stirring. The solution was maintained at ambient temperature overnight, then 11.322 g. of itaconic acid was added and stirred until a clear solution was obtained. The solution was diluted to 25 weight percent solids with dry isopropanol, coated, dried and cured. The dry coat weight was 2.8 grams/square meter; the dry permeability was 1.96 cc and the wet permeability was 82 cc.

Experiment 12

A solution of 11.628 g. of "Ebecryl 220" (described in Experiment 10) was prepared in 70 g. of Dowanol PM, and 10.278 g. of A-1100 (as described in Experiment 11) was added. After standing for one hour at ambient temperature, 12.094 g. of itaconic acid was added and stirred to dissolve. After coating, drying and curing, the dry permeability was 4.4 cc and the wet permeability was 58 cc.

Experiment 13

A solution of 7.398 g. of "Ebecryl 40", a tetra functional acrylate ester with a reported molecular weight of 535, supplied by UCB Radcure, was prepared in 70 g. of Dowanol PM. To this solution was added 12.223 g. of A-1100, and after standing at room temperature for one hour, 14.379 g. of itaconic acid was added and stirred to dissolve. After coating, drying and curing, the dry permeability was 0.2 cc and the wet permeability was 112 cc.

Experiments 14 and 15 demonstrate the effectiveness of the Michael addition products from Z-6020 and mixtures of acrylate esters combined with itaconic acid in a molar ratio of 4:1:10.4 (silane:acrylate:acid) producing barrier coatings for polypropylene film.

Experiment 14

A solution of 2.309 g. of "SR 295" (described in Experiment 11) and 5.246 g. of "Ebecryl 220" (described in Experiment 10) was prepared in 70 g. of Dowanol PM. A total of 10.484 g. of Z-6020 was added, and after standing one hour at ambient temperature, 15.901 g. of itaconic acid was added and stirred to dissolve. After coating, drying, and curing, the dry permeability was 0.1 cc and the wet permeability was 16 cc.

Experiment 15

A solution of 2.309 g. of "SR 295" (described in Experiment 11) and 2.854 g. of "SR238", hexanediol diacrylate, molecular weight 226, was prepared in 70 g. of Dowanol PM. A total of 11.432 g. of Z-6020 was added, and after standing at ambient temperature for one hour, 17.404 g. of itaconic acid was added. After coating, drying and curing, the dry permeability was 0.05 cc and the wet permeability was 22 cc.

Experiment 16 illustrates the effectiveness of the Michael addition products of mixtures of A-1100 and Z-6020 with acrylate esters, combined subsequently with itaconic acid in producing barrier coatings for polypropylene film in a molar ratio of 4:1:10.4 for Z-6020:acrylate:itaconic acid.

Experiment 16

A solution of 4.621 g. of pentaerythritol tetra acrylate "SR 295", (described in Experiment 11) was prepared in 70 g. of Dowanol PM, and 5.824 g. of Z-6020 and 5.807 g. of A-1100 were added. After standing for one hour at ambient temperature, 17.740 g. of itaconic acid was added. After coating, drying, and curing the dry permeability was 0.05 cc and the wet permeability was 27 cc.

Experiment 17 illustrates that an aminosilane/acrylate ester Michael addition product in a molar ratio of 4:1 without added itaconic acid will provide a barrier coating on polypropylene film, but that the barrier properties are greatly enhanced by the addition of itaconic acid (see Experiment 10, where the same components were used but itaconic acid was included).

Experiment 17

A solution of 10.492 g. of "Ebecryl 220", (described in Experiment 10), was dissolved in 70 g. of Dowanol PM, and 9.319 g. of Z-6090 was added. After standing for one hour at ambient temperature, the mixture was coated on polypropylene film, dried, and cured. The dry permeability was 380 cc and the wet permeability was 294 cc.

Experiment 18 illustrates that the concentration of the solids in the coating solution affects the permeability of the resulting coated film.

Experiment 18

A 40 weight percent solids solution of the Michael addition product of Z-6020 and pentaerythritol tetraacrylate with the proper quantity of itaconic acid to provide a molar ratio of 4:1:10.4 (silane:acrylate:itaconic acid) was prepared by dissolving 5.432 g. of "SR 295" in 60 g. of Dowanol PM, and then adding 13.704 g. of Z-6020. After one hour, 20.364 g. of itaconic acid was added and stirred to dissolve. Coated samples were prepared using a #12 Myers Rod. The 40 weight % solution was coated directly, and 20 and 10 weight % solids solutions were prepared by dilution of the 40% solution with Dowanol PM. The permeabilities are described below.

| Coating | Dry Permeability | Wet Permeability |
|---|---|---|
| 40% | 0.15 cc | 7.8 cc |
| 20% | 1.6 cc | 32 cc |
| 10% | 45 cc | 311 cc |

Experiment 19 illustrates that a mixture of Z-6020 and itaconic acid without the addition of an acrylate ester can be used as a barrier coating for film, but that the coating cracks and is undesirable as a barrier film.

Experiment 19

A solution of 7.83 g. of Z-6020 was prepared in 35 g. of Dowanol PM, and 9.17 g. itaconic acid was added and stirred to dissolve. After coating, drying, and curing the coating appeared to be somewhat brittle; a sample exhibited many small cracks rendering it unsuitable for use as a barrier film.

Experiment 20 illustrates that barrier coatings can be prepared using simple mixtures of Z-6020, acrylate esters, and itaconic acid. These results show that allowing the Michael addition to proceed before adding the itaconic acid is an optional requirement.

Experiment 20

A solution of 15.395 g. of "SR 295" (described in Example 11), was prepared in 70 g. of Dowanol PM, and then 12.131 g. of itaconic acid was added and stirred to dissolve, and 6.46 g. of Z-6020 was added. The solution was coated immediately, and after drying and curing, the dry permeability was 14 cc and the wet permeability was 26 cc.

The effect of dose and voltage of the electron beam on the permeability of a barrier coating is illustrated in Experiment 21.

Experiment 21

A solution of 30.79 g. of "SR 295", (described in Experiment 11), was prepared in 112 g. of Dowanol PM, and 12.948 g. of Z-6020 was added. After standing at ambient temperature for one hour, 24.262 g. of itaconic acid and 28 g. of Dowanol PM was added and stirred to dissolve. After coating and drying, the samples were subjected to the electron beam at the conditions described below in Table 1 and the following results were obtained.

TABLE 1

| Dose Optimization | | | |
|---|---|---|---|
| All <50 ppm [$O_2$] | | Permeability | |
| Voltage, KeV | Dose, Mrads | Dry | Wet |
| 125 | 2.5 | 35 | 197 |
| 125 | 5.0 | 19 | 131 |
| 125 | 10.0 | 6 | 50 |
| 150 | 2.5 | 21.0 | 134 |
| 150 | 5.0 | 5.1 | 35 |
| 150 | 10.0 | 5.5 | 23 |
| 170 | 2.5 | 25 | 161 |

TABLE 1-continued

| Dose Optimization | | | |
|---|---|---|---|
| All <50 ppm [O₂] | | Permeability | |
| Voltage, KeV | Dose, Mrads | Dry | Wet |
| 170 | 5.0 | 31 | 140 |
| 170 | 10.0 | 17 | 55 |
| Air | | | |
| 170 | 2.5 | 36.5 | 209 |
| 170 | 5.0 | 15 | 30 |
| 170 | 10.0 | 29.5 | 44 |

Experiment 22

Experiment 22 illustrates the effect of electron beam doses and voltage on another representative barrier coating composition. A solution of 9.234 g. of "SR 295" was prepared in 120 g. of Dowanol PM, and 23.296 g. of Z-6020 was added. The solution was allowed to stand at ambient temperature for 24 hours, then 35.468 g. of itaconic acid and 20 g. of Dowanol PM were added and stirred to dissolve. After coating and drying, the samples were subjected to the electron beam conditions described in Table 2 below and the following results were obtained.

TABLE 2

| Dose Optimization | | | |
|---|---|---|---|
| All <50 ppm [O₂] | | Permeability | |
| Voltage, KeV | Dose, Mrads | Dry | Wet |
| 125 | 2.5 | 0.03 | 48 |
| 125 | 5.0 | 0.06 | 148 |
| 125 | 10.0 | 0.05 | 67 |
| 150 | 2.5 | 0.03 | 86 |
| 150 | 5.0 | 0.65 | 97 |
| 150 | 10.0 | 0.02 | 67 |
| 170 | 2.5 | 0.3 | 43 |
| 170 | 5.0 | 0.1 | 95 |
| 170 | 10.0 | 0.1 | 116 |
| Air | | | |
| 170 | 2.5 | 0.09 | 84 |
| 170 | 5.0 | 0.2 | 212 |
| 170 | 10.0 | 0.3 | 87 |

Experiment 23

Various additives can be included in the compositions of the present invention to achieve improved barrier properties. Table 3 illustrates the effect of adding epoxy functional additives such as glycidyl methacrylate, glycidol, ethylene glycol diglycol ether and bisphenol A to the composition comprising Z-6020, pentaerythritol tetraacrylate, and itaconic acid. The order of addition of each component is listed, and the components were added sequentially in the appropriate molar ratios as shown. As can be seen, the additional additives can improve the barrier properties of the film at high humidity.

Experiment 24

As seen in Table 4, the coated films can give excellent barrier properties if the substrate is primed prior to the application of the coating. The priming solutions were prepared by weighing out the required quantity of primer material and diluting it with the required amount of the appropriate solvent as recited in Table 4. For example, a 0.1 percent polyethylene imine was added to 300 g. of isopropanol in a 600 ml beaker, and stirred to obtain a clear solution. The film substrates were primed by immersing the film in the primer solution which was contained in a shallow plastic tray. The film was agitated to ensure complete coverage by the primer solution, then it was drained and hung vertically to allow the excess primer solution to drain completely and allow the solvent to dry at ambient temperature.

Experiment 25

As illustrated in Table 5, the excellent barrier properties can be achieved by the addition of a polyoxyethylated alkyl phenol to the coating solution prior to application of the coating solution to the substrate.

The wetting agent employed in the experiments described in Table 5 was "Eccoterge EO-100", a polyethoxylated alkyl phenol supplied by Eastern Color and Chemical Co. The indicated quantity of wetting agent was added to each solution by preparing the coating solution at 30 weight present solids in isopropanol and diluting this solution to 15 weight percent solids with isopropanol containing the quantity of wetting agent required to provide the amount indicated.

Experiment 26

The data in Table 6 illustrates that other compounds such as a carbodiimide (Union Carbide Corp., Danbury, Conn.) can be used as a primer for coating compositions of the present invention, and that compositions utilizing an added wetting agent can be successfully applied to primed film. The procedures followed for adding the wetting agents and applying the primers were the same as those followed for Experiments 24 and 25.

Experiment 27

As seen in Table 7, additional additives and primers can be combined to achieve better barrier properties. The procedures followed for applying the wetting agents and primers were the same as those followed for Experiments 24 and 25.

TABLE 3

All solutions were prepared at 30% solids in isopropyl alcohol (except TR-295 and TR-296, which were prepared at 15% solids in isopropyl alcohol) and the amounts of the components are expressed in molar ratios in parentheses next to the components listed. EB conditions: 170 KeV, 10 Mrads.

| Sample # | Composition | Addition order | Coat weight [g/m$^2$] | OTR 0% RH | OTR 80% RH |
|---|---|---|---|---|---|
| TR-295 | Z-6020/PETA/ITA (4:1:10.4), 15% Solids | — | 3.5 | 0.2 | 160 |
| TR-296.1R | Z-6020/PETA/ITA (1:1.5:3.2), 25% Solids | | | | |
| | Effects of the addition order | | | | |
| TR-297 | Z-6020/Glycidyl methacrylate/PETA/ITA (4:1:1:10.4) | GM + Z + P + IA | NM | NM | 132.5 |
| TR-298 | Z-6020/Glycidyl methacrylate/PETA/ITA (4:1:1:10.4) | P + Z + GM + IA | 3.5 | 0.10 | 94 |
| TR-299 | Z-6020/Glycidyl methacrylate/PETA/ITA (4:1:1:10.4) | P + Z + IA + GM | NM | 0.25 | 150 |
| TR-300 | Z-6020/Glycidyl methacrylate/PETA/ITA (4:1:1:10.4) | GM + Z + IA + P | 3.7 | 14.4 | 169 |
| | Effects of the 6020/epoxy ratio | | | | |
| TR-305 | Z-6020/Glycidyl methacrylate/PETA/ITA (4:2:1:10.4) | GM + Z + P + IA | NM | >500 | NM |
| TR-306 | Z-6020/Glycidyl methacrylate/PETA/ITA (4:2:1:10.4) | P + Z + GM + IA | NM | 0.05 | 17 |
| TR-307 | Z-6020/Glycidyl methacrylate/PETA/ITA (4:2:1:10.4) | P + Z + IA + GM | 2.7 | 0.2 | 42 |
| TR-308 | Z-6020/Glycidyl methacrylate/PETA/ITA (4:2:1:10.4) | GM + Z + IA + P | 2.7 | >500 | NM |
| TR-321 | Z-6020/Glycidyl methacrylate/PETA/ITA (4:3:1:10.4) | Z + IA + P + GM | NM | 0.1 | 39 |
| TR-322 | Z-6020/Glycidyl methacrylate/PETA/ITA (4:3:1:10.4) | Z + IA + GM + P | 2.7 | 0.22 | 41 |
| TR-323 | Z-6020/Glycidyl methacrylate/PETA/ITA (4:4:1:10.4) | Z + IA + P + GM | NM | 0.2 | 45 |
| TR-324 | Z-6020/Glycidyl methacrylate/PETA/ITA (4:4:1:10.4) | Z + IA + GM + P | 2.5 | 7.1 | 75 |
| TR-332 | Z-6020/Glycidyl methacrylate/PETA/ITA (4:5:1:10.4) | Z + P + GM + IA | 3.4 | 0.1 | 16.5 |
| TR-333 | Z-6020/Glycidyl methacrylate/PETA/ITA (4:6:1:10.4) | Z + P + GM + IA | NM | 0.2 | 44.5 |
| TR-309 | Z-6020/Glycidyl methacrylate/PETA/ITA (4:2:6:12.8) | GM + Z + P + IA | 2.45 | 22 | 79 |
| TR-311 | Z-6020/Glycidyl methacrylate/PETA/ITA (4:2:6:12.8) | P + Z + IA + GM | 3.8 | 13.2 | 61 |
| TR-336 | Z-6020/Glycidyl methacrylate/PETA/ITA (4:3:6:12.8) | GM + Z + P + IA | 3.1 | 13–20 | 58.8 (100% = 134) |
| TR-337 | Z-6020/Glycidyl methacrylate/PETA/ITA (4:3:6:12.8) | P + Z + IA + GM | 3 | 13.6 | 61 (100% = 142) |
| TR-338 | Z-6020/Glycidyl methacrylate/PETA/ITA (4:4:6:12.8) | GM + Z + P + IA | NM | 11.2 | 35 |
| TR-339 | Z-6020/Glycidyl methacrylate/PETA/ITA (4:4:6:12.8) | P + Z + IA + GM | 3.4 | 9.8 | 40 |
| TR-301 | Z-6020/Glycidol/PETA/ITA (4:1:1:10.4) | G + Z + P + IA | NM | 0.2 | NM |
| TR-302 | Z-6020/Glycidol/PETA/ITA (4:1:1:10.4) | P + Z + G + IA | 4.4 | 0.15 | 112 |
| TR-303 | Z-6020/Glycidol/PETA/ITA (4:1:1:10.4) | P + Z + IA + G | 3.4 | 0.25 | 66 |
| TR-304 | Z-6020/Glycidol/PETA/ITA (4:1:1:10.4) | G + Z + IA + P | 2.7 | 8.0 | 123 |
| TR-334 | Z-6020/Glycidol/PETA/ITA (4:2:1:10.4) | P + Z + IA + G | 3.2 | 0.1 | 27.9 |
| TR-335 | Z-6020/Glycidol/PETA/ITA (4:4:1:10.4) | P + Z + IA + G | NM | 0.25 | 22.6 |
| TR-319 | Z-6020/Glycidol/PETA/ITA (4:1:6:12.8) | G + Z + P + IA | 3.7 | 12.5 | 37 |
| TR-320 | Z-6020/Glycidol/PETA/ITA (4:1:6:12.8) | P + Z + IA + G | NM | >500 | NM |
| TR-313 | Z-6020/Glycidol/PETA/ITA (4:2:6:12.8) | G + Z + P + IA | 2.9 | 250 | 80 |
| TR-315 | Z-6020/Glycidol/PETA/ITA (4:2:6:12.8) | P + Z + IA + G | 2.6 | 12.3 | 36 |
| TR-341 | Z-6020/Glydidol/PETA/ITA (4:3:6:12.8) 25% solids | P + Z + IA + G | 2.9 | 10.7 | 48 |
| TR-343 | Z-6020/Glydidol/PETA/ITA (4:3:6:12.8) 25% solids | P + Z + IA + G | NM | 13.1 | 49 |
| | Other epoxies | | | | |
| TR-317 | Z-6020/EthGlyDiGlEther/PETA/ITA (4:0.25:1:10.4) | Z + P + IA + E | NM | >500 | NM |
| TR-318 | Z-6020/EthGlyDiGlEther/PETA/ITA (4:0.25:1:10.4) | Z + P + E + IA | 1.4 | 2 | 176 |
| TR-355 | Z-6020/Bisphenol A/PETA/ITA (4:2:1:10.4) | P + Z + GM + IA | 2.3 | 6.7 | 35 |
| TR-356 | Z-6020/Bisphenol A/PETA/ITA (4:2:1:10.4) | P + Z + IA + GM | 3.1 | 0.15 | 77 |
| TR-357 | Z-6020/Bisphenol A/PETA/ITA (4:4:1:10.4) | Z + IA + GM + P | NM | 0.3 | 179 |

*P = PETA,
IA or ITA = ITACONIC ACID,
Z = Z-6020,
GM = GLYCIDYL METHACRYLATE,
G = GLYCIDOL,
E = EPOXY.
The letters are written in the order of additon of the components in the solutions. NM means "not measured".

TABLE 4

| Sample | Composition | Primer | OTR 0% RH | OTR 80% RH |
|---|---|---|---|---|
| TR-325 | Z-6020/PETA/ITA(1:1.5:3.2) | 3% Z6020 in IPA/water | 1.1 | 144 |
| TR-325.1 | Z-6020/PETA/ITA(1:1.5:3.2) | 1% Z6020 in IPA/water | 1.3 | 111 |
| TR-325.2 | Z-6020/PETA/ITA(1:1.5:3.2) | 0.1% 6020 in IPA/water | 10.5 | 80 |
| TR-326.2 | Z-6020/PETA/ITA(4:1:10.4) | 0.1% 6020 in IPA/water | 0.3 | 50 |
| TR-327 | Z-6020/PETA/ITA(1:1.5:3.2) | 0.1% Peimine primer in IPA | 10.6 | 76 |
| TR-328 | Z-6020/PETA/ITA(4:1:10.4) | 0.1% Peimine primer in IPA | 0.15 | 31 |
| TR-352 | Z-6020/PETA/ITA(4:1:10.4) | 0.1% Peimine primer in IPA | 0.4 | 22 |
| TR-352.1 | Z-6020/PETA/IPA(4:1:10.4) | 0.01% Peimine primer in IPA | 0.2 | 31 |

TABLE 4-continued

| Sample | Composition | Primer | OTR 0% RH | OTR 80% RH |
|---|---|---|---|---|
| TR-353 | Z-6020/PETA/ITA(4:1:10.4) | 0.1% 6020 hydrolyzed overnight in IPA | 0.2 | 20 |
| TR-354 | Z-6020/PETA/ITA(4:1:10.4) | 12629/144-3 hydrolyzed ½ h in IPA/water | 0.1 | 20 |

All solutions were prepared at 15% solids, except TR-352, 352.1, 353, and 354 were prepared at 25% solids.
EB conditions: 170 KeV, 10 Mrads.

TABLE 5

| Sample | Composition | Wetting agent | OTR 0% RH | OTR 80% RH |
|---|---|---|---|---|
| TR-329 | Z-6020/PETA/ITA(1:1.5:3.2) | 1% polyethoxylated phenol | 22.5 | 78 |
| TR-329.1 | Z-6020/PETA/ITA(1:1.5:3.2) | 0.1% polyethoxylated phenol | 16.5 | 69 |
| TR-330 | Z-6020/PETA/ITA(4:1:10.4) | 1% polyethoxylated phenol | 0.95 | 60 |
| TR-330.1 | Z-6020/PETA/ITA(4:1:10.4) | 0.1% polyethoxylated phenol | 0.25 | 28 |
| TR-344 | Z-6020/PETA/ITA(4:1:10.4) | 1% polyethoxylated phenol | 0.3 | 88 |
| TR-344.1 | Z-6020/PETA/ITA(4:1:10.4) | 0.1% polyethoxylated phenol | 0.4 | 68 |
| TR-345 | Z-6020/PETA/ITA(1:1.5:3.2) | 1% polyethoxylated phenol | 23.5 | 74 |
| TR-345.1 | Z-6020/PETA/ITA(1:1.5:3.2) | 0.1% polyethoxylated phenol | 17 | 69 |

All solutions were prepared at 15% sold weight in IPA.
EB conditions: 170 KeV, 10 Mrads.

TABLE 6

| Sample | Composition | Coat weight | OTR 0% RH | OTR 80% RH |
|---|---|---|---|---|
| TR-346 | STD 1:1.5 on double side OPP primed with 0.1% carbodiimide, 15% solids | NM | 23.5 | 75 |
| TR-347 | STD 4:1 on double side OPP primed with 0.1% carbodiimide, 15% solids | 2.0 | 0.11 | 34 |
| TR-347.1 | STD 1:1.5 on double side OPP primed with 0.1% carbodiimide, 25% solids | 3.5 | 0.09 | 22 |
| TR-351 | STD 4:1 on double side OPP primed with 0.1% unhydrolyzed Z-6020, 25% solids | 2.8 | 7.6 | 37 |
| TR-369 | STD 4:1 on 0.1% PEI primed OPP with 0.1% polyethoxylated phenol, 25% solids | 2.9 | 0.65 | 23 |
| TR-369.1 | STD 4:1 on 0.1% PEI primed OPP with 0.1% polyethoxylated phenol, top coated with 0.1% carbodiimide, 25% solids | 2.9 | 0.4 | 23 |
| TR-370 | STD 1:1.5 on 0.1% PEI primed OPP with 0.1% polyethoxylated phenol, 25% solids | 3.15 | 7.3 | 38 |

EB conditions: 170 KeV, 10 Mrads.
PEI = polyethylenimine.

TABLE 7

| Sample | Composition | Wetting agent | Addition order | CW g/m$^2$ | OTR 0% RH | OTR 80% RH |
|---|---|---|---|---|---|---|
| TOR-360 | Z/6020/GM/PETA/ITA (4:5:1:10.4) 15% solids | — | Z + P + GM + IA | 1.6 | 1.0 | 110 |
| TR-361 | Z/6020/GM/PETA/ITA (4:5:1:10.4) 5% solids | — | Z + P + GM + IA | 0.6 | 10.5 | 277 |
| TR-359 | Z/6020/GM/PETA/ITA (4:5:1:10.4) 25% solids | 0.1% Polyethoxylated phenol | Z + P + GM + IA | 2.7 | 0.18 | 24 |
| TR-365 | Z/6020/GM/PETA/ITA (4:5:1:10.4) 25% solids | 0.1% PEI primer | Z + P + GM + IA | 0.6 | 0.32 | 34 |
| TR-366 | Z/6020/GM/PETA/ITA (4:5:1:10.4) 25% solids | 0.1% Polyethoxylated phenol on 0.1% PEI primed film | Z + P + GM + IA | 2.6 | 0.21 | 29 |
| TR-363 | Z/6020/GM/PETA/ITA (4:4:6:12.8) 25% solids | 0.1% Polyethoxylated phenol | GM + Z + P + IA | NM | 14.2 | 41 |
| TR-363.1 | Z/6020/GM/PETA/ITA (4:4:6:12.8) 25% solids | 0.1% PEI primer | GM + Z + P + IA | 3.1 | 12.5 | 42 |
| TR-363.2 | Z/6020/GM/PETA/ITA (4:4:6:12.8) 25% solids | 0.1% Polyethoxylated phenol on 0.1% PEI primed film | GM + Z + P + IA | NM | 10.2 | 46 |
| TR-358 | Z-6020/Glycidol/PETA/ITA (4:2:6:12.8), 25% solids | 0.1% Polyethoxylated phenol | P + Z + IA + G | 2.6 | 0.15 | 34 |

TABLE 7-continued

| Sample | Composition | Wetting agent | Addition order | CW g/m² | OTR 0% RH | OTR 80% RH |
|---|---|---|---|---|---|---|
| TR-362.1 | Z-6020/Glycidol/PETA/ITA (4:2:6:12.8), 25% solids | 0.1% PEI primer | P + Z + IA + G | NM | 9.4 | 34 |
| TR-362.2 | Z-6020/Glycidol/PETA/ITA (4:2:6:12.8), 25% solids | 0.1% Polyethoxylated phenol on 0.1% PEI primed film | P + Z + IA + G | 3.1 | 8.6 | 45 |
| TR-362 | Z-6020/Glycidol/PETA/ITA (4:4:1:10.4), 25% solids | 0.1% Polyethoxylated phenol | P + Z + IA + G | NM | 13.2 | 55 |
| TR-364 | Z-6020/Glycidol/PETA/ITA (4:4:1:10.4), 25% solids | 0.1% PEI primer | P + Z + IA + G | 3.0 | 0.1 | 34 |
| TR-367 | Z-6020/Glycidol/PETA/ITA (4:4:1:10.4), 25% solids | 0.1% Polyethoxylated phenol on 0.1% PEI primed film | P + Z + IA + G | 2.9 |  | 24 |
| TR-368 | Z-6020/Glycidol/PETA (4:4:1), 16% solids |  | P + Z + G | 1.4 | >500 | 1211 |

EB conditions: 170 KeV, 10 Mrads.
*P = PETA,
IA or ITA = ITACONIC ACID,
Z = Z-6020,
GM = GLYCIDYL METHACRYLATE,
G = GLYCIDOL,
E = EPOXY and
PEI = POLYETHYLENIMINE.
The letters are written in the order of additon of the components in the solutions. NM means "not measured".

Experiment 28

This comparison example shows the barrier values of a coating including colloidal silica. A mixture of 1.08 g of aminopropyltrimethoxysilane, 25.36 g of isopropyl alcohol, 1.36 g of hexanedioldiacrylate and 3.79 g of trimethoxypropanetriacrylate was stirred at room temperature for 72 hours. To this mixture was added 0.23 g of acrylic acid. The mixture was then allowed to stand for five minutes. Next, 12.73 g of Nalco 1129 (colloidal silica) was added while the mixture underwent vigorous agitation. The resulting mixture was then filtered through a 5 micron filter. All samples were applied on corona treated 50 mu OPP, coated to a thickness of approximately 5 mu with a #4 Myers rod. The samples were UV cured using a Fusion h bulb (360–365 nm), 300 W/in power rating, delivering a dose of between 300 and 500 mJoules. The wet barrier values are shown in Table 8 below. The samples showed extremely high oxygen transmission rates.

TABLE 8

| Sample | Corona treatment | OTR 80% RH | Average OTR |
|---|---|---|---|
| 1AHS | High | 468 | 526 |
| 2AHS | high | 585 |  |
| 1ALS | low | 631 | 690 |
| 2ALS | low | 750 |  |

Experiment 29

PETA and Z-6020 were first reacted for an hour in the each of the respective solvents listed in Table 10, according to the standard 4:1 ratio. Itaconic acid was then added. The coating was coated as 30% solids. Drying was performed in a moist oven, at 90° C. and for 10 minutes. The coating was then EB cured at 170 kV and 10 Mrads. The data variations were not large. The specific results are set forth in Table 10 below.

TABLE 10

| Formulation | Solvent | CW (g/m²) | 0% RH OTR (cc/m²day) | 80% RH OTR (cc/m²day) |
|---|---|---|---|---|
| Z-6020/PETA/ITA (4:1:10.4) | Methanol | NM | 71 | 350 |
| Z-6020/PETA/ITA (4:1:10.4) | Ethanol | NM | 42 | 185 |
| Z-6020/PETA/ITA (4:1:10.4) | 1-Propanol | NM | 1.5 | 154 |
| Z-6020/PETA/ITA (4:1:10.4) | 1-Butanol | NM | 1.1 | 214 |
| Z-6020/PETA/ITA (4:1:10.4) | Dowanol PM | NM | 17 | 190 |

Experiment 30

Table 11 below illustrates that the coatings of the present invention can provide reduced oxygen transmission rates for a variety of substrates, such as low density polyethylene (LDPE) and polyethylene terephthalate (PET). In the 4:1 formulation, a solution of 9.234 g of SR295 (PETA Sartomer) was prepared in 120 g Dowanol PM, and 23.296 g of Z6020 was added. The solution was allowed to stand for 24 hours, then 35.468 g of itaconic acid and 20 g Dowanol PM was added and stirred. After coating and drying, the samples were exposed to electron beam irradiation. For the 1:1.5 formulation, a solution of 30.79 g of SR295 (PETA Sartomer) was prepared in 112 g Dowanol PM, and 12.948 g of Z6020 was added. The solution was allowed to stand for 1 hour at ambient temperature, then 24.262 g of itaconic acid and 28 g Dowanol PM was added and stirred to dissolve. After coating and drying, the samples were exposed to electron beam irradiation. For the 4:1/1:1.5 blend, both solutions were prepared as described above, then mixed 1:1, coated, dried and electron beam irradiated.

TABLE 11

| Substrate | Formulation | OTR 0% | OTR 100% |
|---|---|---|---|
| LDFE (125 mu) | 4:1 | 0.65 | 240 |
| LDPE (125 mu) | 1:1.5 | 17.5 | 134 |
| LDPE (125 mu) | 4:1 + 1:1.5 | 0.5 | 43 |
| LDPE (125 mu) | None | 3000 | 3000 |
| PET (50 mu) | 4:1 | 0.25 | 19.5 |
| PET (50 mu) | 1:1.5 | 6.8 | 14.8 |
| PET (50 mu) | None | NM | 21.4 |

Experiment 31

The following experiments illustrate that the order of addition of the aminosilane, ethylenically unsaturated acid and multifunctional acrylate components are not critical.

"Semi-Quenched" 4:1

5.432 g of PETA was dissolved in 60 g of dry isopropanol and 3.426 g of Z-6020 was added. This solution was maintained for 30 minutes at ambient temperature then 20.864 g of itaconic acid was added and while stirring 10.278 g of Z-6020 was added. Stirring was continued until a clear solution was obtained. 3.5 g/m² was coated on OPP to give 9.1 cc at 0% RH and 27 cc at 80% RH. The film was initially primed with 0.1% polyethylenimine. This experiment was repeated maintaining all conditions the same, but without the primer and gave 0.3 cc at 0% RH and 18 cc at 80% RH.

"Quenched" 4:1

5.432 g of PETA was dissolved in 60 g of dry isopropanol and 20.864 g of itaconic acid was added. While stirring, 13.704 g of Z-6020 was added and stirring was continued until a clear solution was obtained. 2.9 g/m² was coated on OPP to give 1 cc at 0% RH and 15 cc at 80% RH.

"Quenched" 1:1.5

A solution of 30.79 g of SR295 (PETA Sartomer) was prepared in 112 g Dowanol PM, 24.262 g of itaconic acid and 28 g Dowanol PM was added and stirred to dissolve and finally 12.948 g of Z6020 was added. The solution was coated and dried, and the samples were subjected to electron beam irradiation. 2.7 g/m² was coated on OPP to give 126 cc at 0% RH and 157 cc at 80% RH.

Experiment 32

A solution of 9.234 g of SR295 (PETA Sartomer) was prepared in 120 g Dowanol PM, and 23.296 g of Z6020 was added (4:1 formulation). The solution was allowed to stand for 24 hours, then 35.468 g of itaconic acid and 20 g Dowanol PM was added and stirred. After coating and drying, the samples were exposed to electron beam irradiation. A second solution was prepared with 10 g of polyethylenimine, having a molecular weight of 700M with 29.71 g of itaconic acid, and 92.66 g of IPA. This second solution was added to the first to arrive at a solution with solids ratios (1st formulation to second formulation) of 40:60, 60:40 and 80:20. Coat weights were in the order of 3.5 g/m². Barriers at 80% RH were 60.9 cc, 55.1 cc and 80.7 cc respectively.

The foregoing specification describes only the preferred embodiment and the alternate embodiments of the invention. Other embodiments may be articulated as well. It is expected that other will perceive differences which while differing from the foregoing, do not depart from the spirit and scope of the invention herein described and claimed.

We claim:

1. A composition comprising:
   the reaction product, optionally dissolved in a solvent, of an aminofunctional silane having at least one molecule of the formula $$R^1-N\!\!\left[\!\!\begin{array}{c}\\R^1\end{array}\!\!-\!\!R^2-N\!\!\begin{array}{c}\\R^1\end{array}\!\!\right]_a\!\!-R^1 \tag{IV}$$

wherein
   $0 \leq a \leq 4$
   $R^1$ is independently hydrogen, alkyl, substituted alkyl, aryl, substituted aryl, arylalkyl, acryl, methacryl, alkylaryl, $R^2-SiR_m(OR)_{3-m}$, or an alkylene linking group having 2 to 12 carbon atoms connected to one or two nitrogen atoms, with the proviso that at least one $R^1$ is a hydrogen atom and at least one $R^1$ and $R^2-SiR_m(OR)_{3-m}$ group, where m is 0, 1 or 2, and R is independently a hydrogen or an alkyl group having from 1 to 6 carbon atoms;
   $R^2$ is independently selected from the group consisting of: linear or branched alkylene groups having from 1 to 12 carbon atoms; arylene groups having from 6 to 12 carbon atoms; and linear or branched hydrocarbon groups having from 1 to 16 carbon atoms and at least one alcohol, alcohol ether, ester, amide, urea, thiourea or polyether group,
   a multifunctional acrylate having a molecular weight of from 100 to 3000;
   and an ethylenically unsaturated dicarboxylic acid or a monoalkylester thereof.

2. The composition according to claim 1, characterized in that the aminofunctional silane is N-(2-aminoethyl)-3-aminopropyltrimethoxysilane or aminopropyltriethoxy silane or blends thereof.

3. The composition according to claim 1 wherein the molar ratio of aminofunctional silane to multifunctional acrylate is from 4:1 to 1:1.

4. The composition according to claim 3 wherein the molar ratio of aminofunctional silane to multifunctional acrylate is about 2:1.

5. The composition according to claim 1 wherein the molar ratio of aminofunctional silane to multifunctional acrylate is from 1:1 to 1:6.

6. The composition according to claim 5 wherein the molar ratio of aminofunctional silane to multifunctional acrylate is about 1:3.

7. The composition according to claim 1 wherein the multifunctional acrylate is selected from the group consisting of:
   acrylated polyols with molecular weights from 150 to 600;
   polyester acrylates with molecular weights from 1000 to 2000;
   polyether acrylates with molecular weights from 200 to 1500;
   polyester urethane acrylates with molecular weights from 400 to 2000;
   polyurea acrylates with molecular weights from 400 to 2000;
   epoxy acrylates with molecular weights from 300 to 1000; and
   mixtures thereof.

8. The composition according to claim 7 wherein the multifunctional acrylate is selected from the group consisting of: pentaerythritol tetraacrylate, ditrimethylolpropane tetraacrylate, trimethylolpropane triacrylate, glycerol triacrylate, triacrylate ester of tris-[2-hydroxy-ethyl] isocyanurate, hexanediol diacrylate, and dipentaerythritol hexacrylate, and ethoxylated and propoxylated derivatives of the above.

9. The composition according to claim 1 wherein the reaction product is dissolved in a solvent and the solvent is a water/alcohol mixture where the alcohol present in an amount of 1–99% and the solvent constitutes 60–95 parts by weight of the total composition.

10. The composition according to claim 1 wherein the molar ratio of the ethylenically unsaturated acid to the aminofunctional groups of the silane is from 1:1 or greater.

11. The composition according to claim 1 wherein the ethylenically unsaturated dicarboxylic acid is selected from the group consisting of itaconic acid, fumaric acid, maleic acid, citraconic acid, mesaconic acid and mixtures thereof.

12. The composition according to claim 1 wherein the aminofunctional silane is N-(2-aminoethyl)-3-aminopropyltrimethoxysilane or aminopropyltriethoxy silane, the ethylenically unsaturated acid is itaconic acid, and the multifunctional acrylate is pentaerythritol tetraacrylate.

13. The composition according to claim 1 wherein the molar ratio of aminofunctional silane to multifunctional acrylate is about 1:1.5.

14. The composition according to claim 1 wherein said composition includes an additive.

15. The composition according to claim 14 wherein said composition includes an additive, and said additive is selected from the group consisting of a silane, polyethylenimine, glycidyl methacrylate, glycidol, ethylene glycol diglycol ether, bipshenol A, polyethoxylated phenol.

16. The composition according to claim 1 wherein said composition is coated on a substrate.

17. A method comprising the steps of:
(I) coating a composition according to claim 1 on a substrate
(II) exposing the coated substrate of (I) to moisture, and
(III) treating the substrate of (II) to initiate a free radical reaction.

18. The method according to claim 17, wherein the free radical reaction of step (III) is initiated by electron beam radiation, gamma radiation or ultraviolet radiation, optionally in the presence of photoinitiators, or said free radical reaction is initiated thermally in the presence of a free radical generator.

19. The method according to claim 18, wherein the electron beam radiation has an energy of from 50 KeV and greater than 2.5 Mrads.

20. The method according to claim 19, wherein said composition is cured by electron beam radiation at 150 KeV and at least 5 Mrads.

21. The method according to claim 17, wherein step (II) comprises heating the coated substrate of step (I) in the presence of moisture.

22. The method according to claim 17, wherein the substrate is selected from the group consisting of polyolefins, including oriented polypropylene (OPP), cast polypropylene, polyethylene and polyethylene copolymer; polystyrene; polyesters, including polyethylene terephthalate (PET), or polyethylene naphthalate (PEN); polyolefin copolymers, including ethylene vinyl acetate, ethylene acrylic acid and ethylene vinyl alcohol (EVOH), polyvinylalcohol and copolymers thereof; polyamides, including nylon, and MXD6; polyimides; polyacrylonitrile; polyvinylchloride; polyvinyl dichloride; polyvinylidene chloride; polyacrylates; ionomers; polysaccharides; including regenerated cellulose; silicone, including rubbers or sealants; natural or synthetic rubbers; glassine or clay coated paper; paper board; craft paper; and metallized films and vapor deposited metal oxide coated polymer films, including $AlO_x$, $SiO_x$, $TiO_x$.

23. The method according to claim 17, wherein the substrate is treated with a primer.

24. The method according to claim 23, wherein the primer is selected from the group consisting of a silane, polyethylenimine, and carbodiimide.

25. The method according to claim 17 wherein the substrate of step (III) is disposed on one or more additional substrates to form a laminate, and said additional substrate or substrates are optionally primed.

26. The method according to claim 25, wherein the additional substrates used to form the laminate are selected from the group consisting of polyolefins, including oriented polypropylene (OPP), case polypropylene, polyethylene and polyethylene copolymer; polystyrene; polyesters, including polyethylene terephthalate (PET), or polyethylene naphthalate (PEN); polyolefin copolymers, including ethylene vinyl acetate, ethylene acrylic acid and ethylene vinyl alcohol (EVOH), polyvinylalcohol and copolymers thereof; polyamides, including nylon, and MXD6; polyimides; polyacrylonitrile; polyvinylchloride; polyvinyl dichloride; polyvinylidene chloride; polyacrylates; ionomers; polysaccharides, including regenerated cellulose; silicone, including rubbers or sealants; natural or synthetic rubbers; glassine or clay coated paper; paper board; craft paper; and metallized films and vapor deposited metal oxide coating polymer films, including $AlO_x$, $SiO_x$, $TiO_x$.

27. A packaging container comprising at least one silicone containing layer forming an integral part of said packaging container, wherein said silicone containing layer is formed by a method according to claim 17.

28. A packaging container according to claim 27, wherein the package is selected from the group consisting of a pouch, tube, vial, bottle, bag-in-box, stand-up pouch, gable top carton, thermoformed tray, brick-pack, box, and cigarette pack.

29. The composition according to claim 12 wherein said composition is coated on a substrate.

* * * * *